US010858126B2

(12) United States Patent
Doggett et al.

(10) Patent No.: US 10,858,126 B2
(45) Date of Patent: Dec. 8, 2020

(54) DEFORMABLE CLOSURE MECHANISM

(71) Applicant: U.S.A., as represented by the Administrator of the National Aeronautics and Space Administration, Washington, DC (US)

(72) Inventors: William R. Doggett, Poquoson, VA (US); Timothy S. Roach, Virgina Beach, VA (US); Gerard D. Valle, Pearland, TX (US); Molly M. Selig, League City, TX (US); Winfred S. Kenner, Yorktown, VA (US); Thomas C. Jones, Newport News, VA (US); Judith J. Watson, Yorktown, VA (US); Lynn M. Bowman, Chesapeake, VA (US); Mary Jane E. O'Rourke, Seabrook, TX (US); Bryan C. Yount, Sunnyvale, CA (US); Alberto Makino, Standford, CA (US); John T. Dorsey, Hampton, VA (US); Russell W. Smith, Newport News, VA (US); Clarence E. Stanfield, Hampton, VA (US); Jasen L. Raboin, League City, TX (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 704 days.

(21) Appl. No.: 15/441,318

(22) Filed: Feb. 24, 2017

(65) Prior Publication Data
US 2017/0247127 A1    Aug. 31, 2017

Related U.S. Application Data

(60) Provisional application No. 62/299,761, filed on Feb. 25, 2016.

(51) Int. Cl.
*B64G 1/66* (2006.01)
*B64G 1/10* (2006.01)
(Continued)

(52) U.S. Cl.
CPC ............... *B64G 1/66* (2013.01); *B64G 1/10* (2013.01); *B64G 1/12* (2013.01); *B64G 2001/224* (2013.01)

(58) Field of Classification Search
CPC ... B64G 1/66; B64G 1/10; B64G 1/12; B64G 2001/224
See application file for complete search history.

(56) References Cited

U.S. PATENT DOCUMENTS 3,929,178 A * 12/1975 Hickey ................. E04H 15/646
206/524.8
3,936,927 A    2/1976 Schneider
(Continued)

OTHER PUBLICATIONS

Schneider, William C., "TSS—1R Mission Failure Investigation Board," May 20, 1996, (co-authored) Final Report, (Tethered Satelite Failure), 365 pages.
(Continued)

*Primary Examiner* — Valentina Xavier
(74) *Attorney, Agent, or Firm* — M. Bruce Harper; Jonathan B. Soike; Helen M. Galus

(57) ABSTRACT

A deformable closure mechanism for an aperture that may include an aperture seal that has a seal seat between an internal support structure and an external support structure. A barrier structure may be configured to resealably close the aperture, and have a central membrane and a barrier sealed that is inflatable in order to engage the barrier structure with the aperture seal.

17 Claims, 17 Drawing Sheets

(51) Int. Cl.
*B64G 1/12* (2006.01)
*B64G 1/22* (2006.01)

(56) References Cited

U.S. PATENT DOCUMENTS

| | | | |
|---|---|---|---|
| 4,562,979 A * | 1/1986 | Taylor | B64G 9/00 |
| | | | 220/8 |
| 4,579,302 A | 4/1986 | Schneider et al. | |
| 4,757,767 A | 7/1988 | Wesselski et al. | |
| 4,763,762 A | 8/1988 | Schneider et al. | |
| 4,864,910 A | 9/1989 | King et al. | |
| 5,071,091 A | 12/1991 | Kahn et al. | |
| 5,735,488 A | 4/1998 | Schneider | |
| 6,206,155 B1 | 3/2001 | Schneider | |
| 6,231,010 B1 | 5/2001 | Schneider et al. | |
| 6,321,746 B1 * | 11/2001 | Schneider | A61G 10/026 |
| | | | 128/202.12 |
| 6,547,189 B1 | 4/2003 | Raboin et al. | |
| 6,938,858 B1 | 9/2005 | Schneider et al. | |
| 6,974,109 B1 * | 12/2005 | Mezits | B64G 1/52 |
| | | | 244/158.3 |
| 6,997,637 B2 | 2/2006 | Schneider et al. | |
| 2012/0318926 A1 | 12/2012 | Ingham et al. | |

OTHER PUBLICATIONS

Schneider, William C. et al., "Magnetic Docking Aid for the Orbiter to International Space Station Docking," Publication of the 30th Aerospace Mechanism Symposium, 1996, pp. 345-359.

Chaffee, Norman, "Space Shuttle Technical Conference" NASA Conference Publication 2342, Part 1, Jun. 28-30, 1983, Space Shuttle Technical Conference, Houston, TX.

Moser, T. L., et al., "Strength Integrity of Space Shuttle Orbiter Tiles," Nov. 11-13, 1981, AIAA 1st Flight Testing Conference, Las Vegas, Nevada.

Schneider, William C. et al., "An Equilibrium Solution for a Fluid Saturated Porous Elastic Solid," Journal of Elasticity, Apr. 1977, vol. 7 No. 2, Noordoff International Publishing—Leyden, Netherland.

Richard Barido et al., "Breadboard Development of the Advanced Inflatable Airlock System for EVA," 2003.

Cadogan, David, "Overview of Inflatable Airlock & Related Technologies," ILC Dover Presentation Slides, Technical Briefing for the Future In-Space Operations Colloquium, Apr. 25, 2007, 21 pages.

* cited by examiner

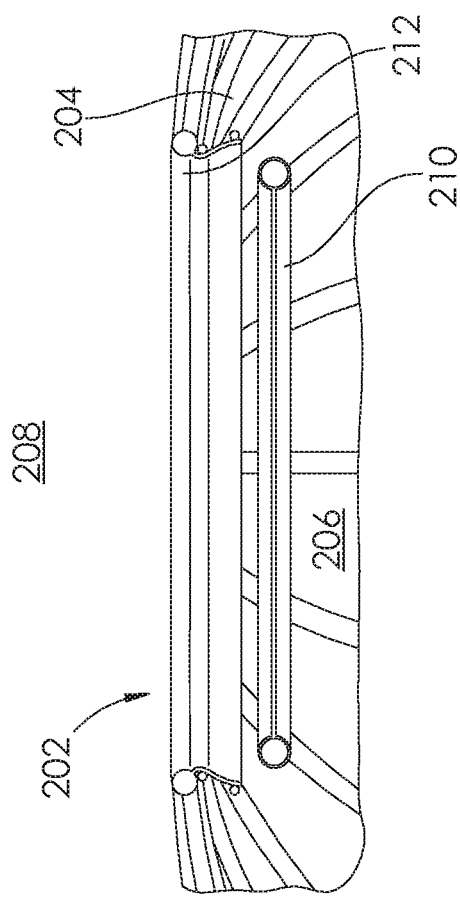
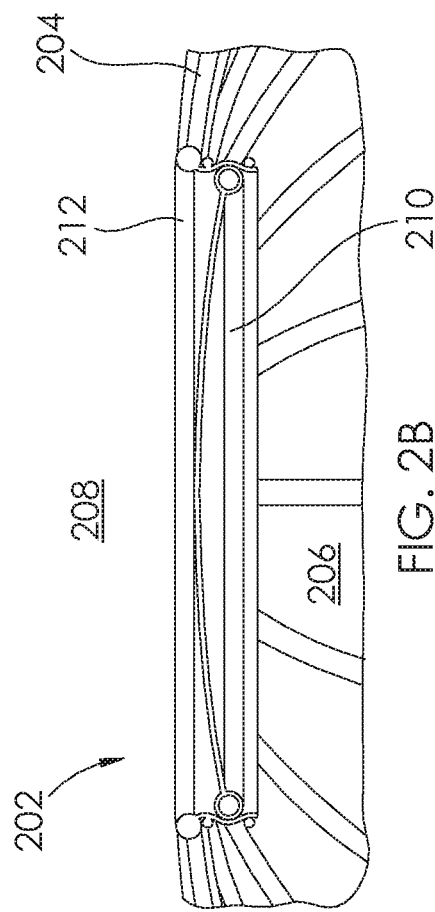

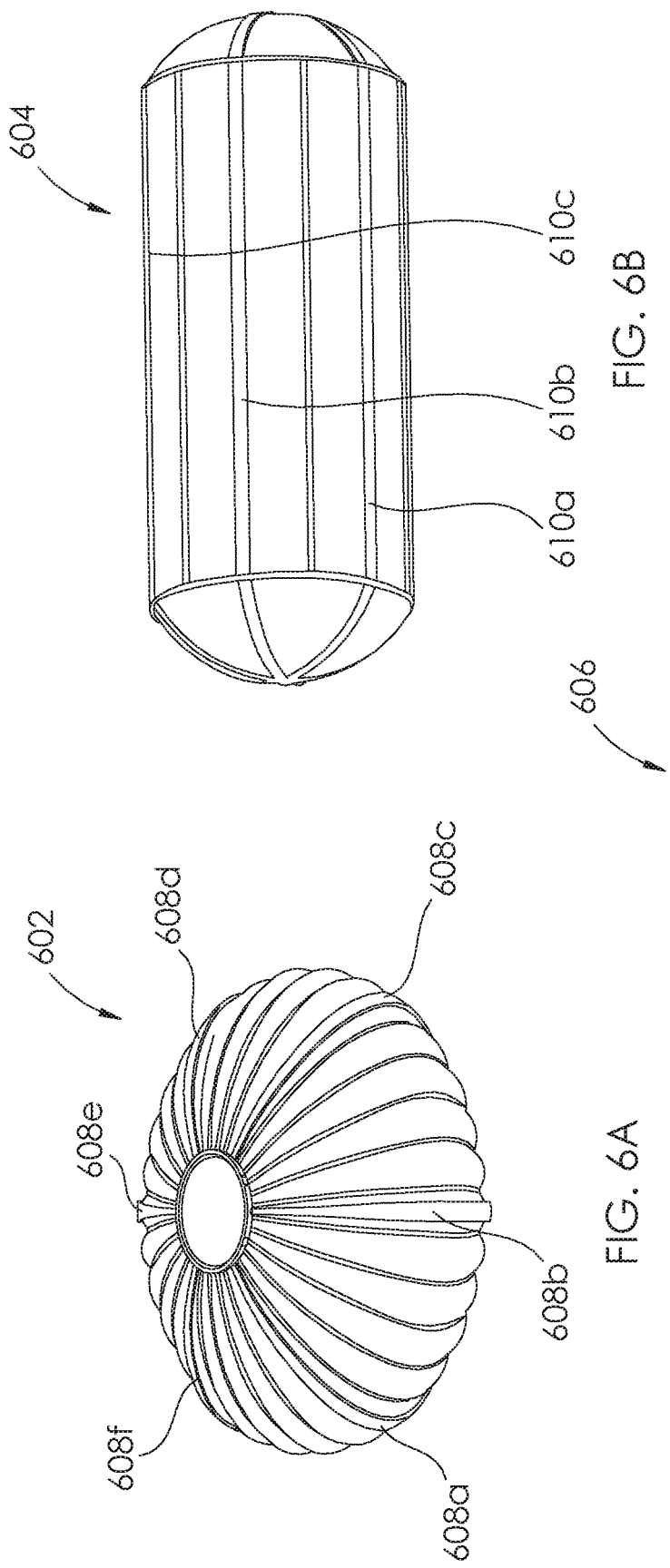

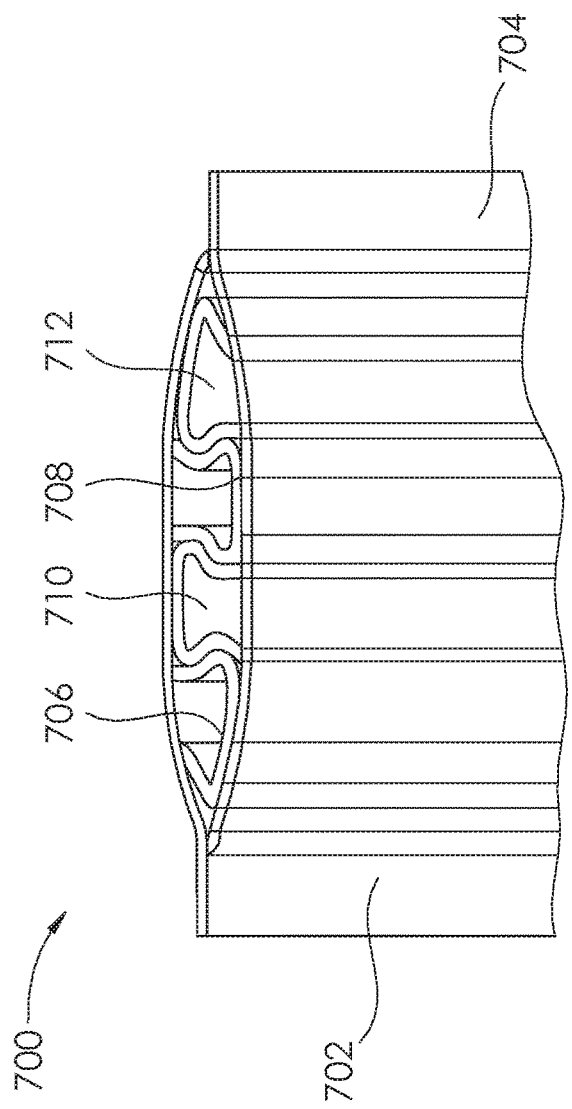
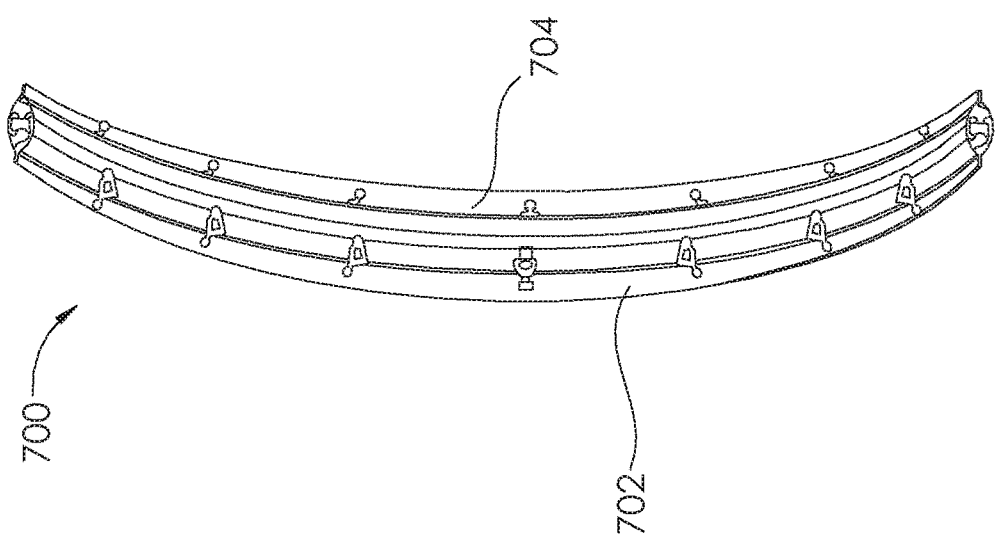

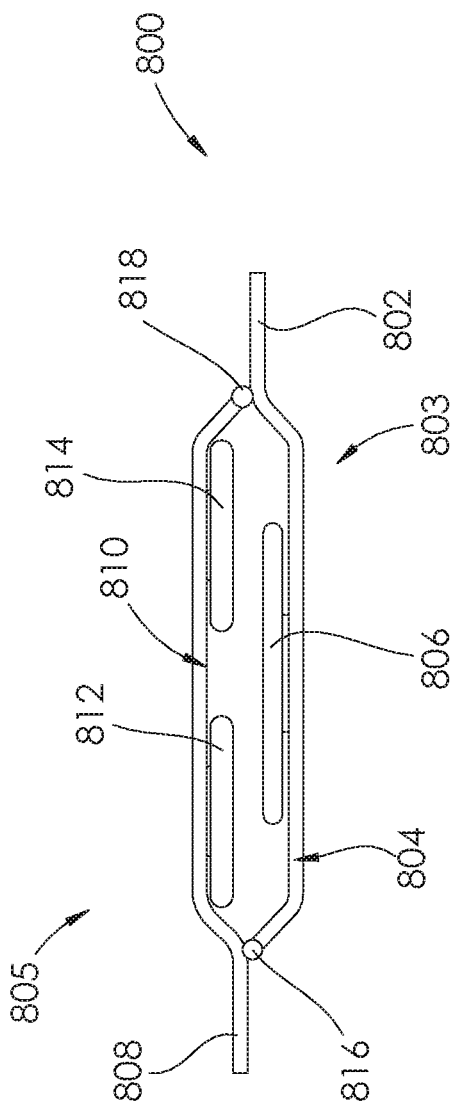
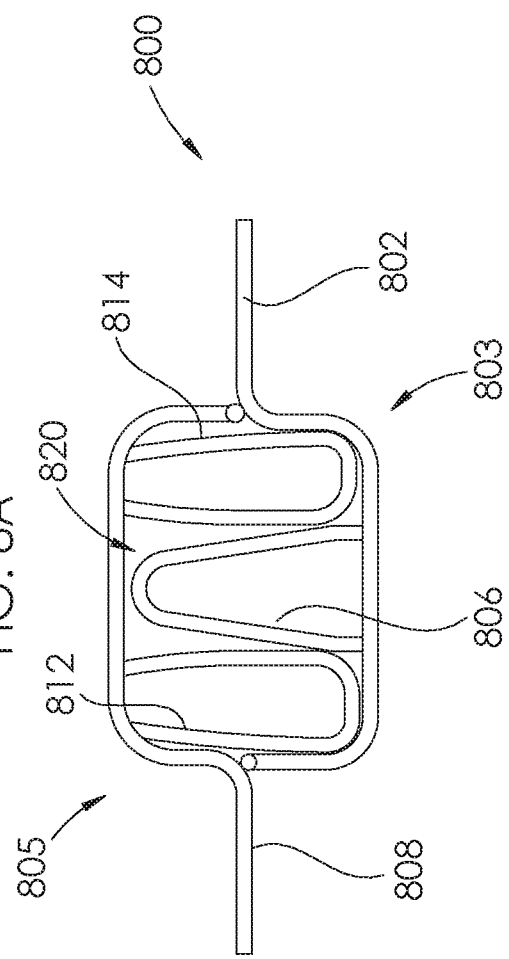

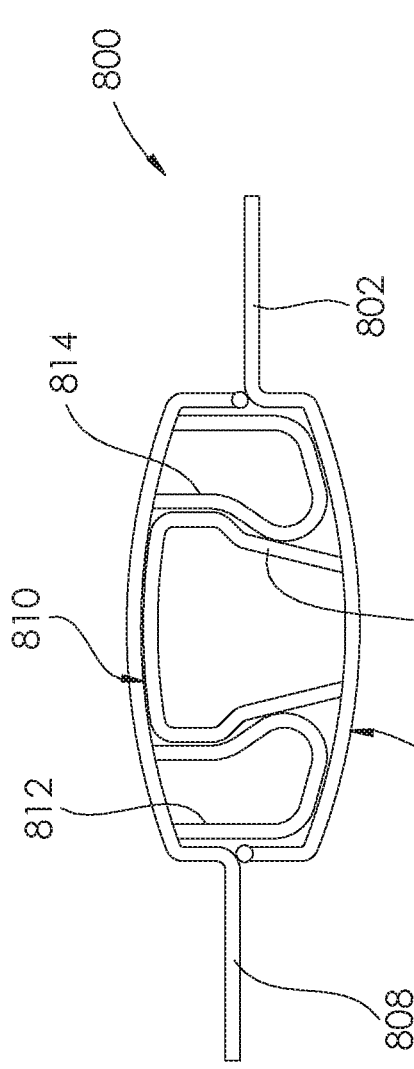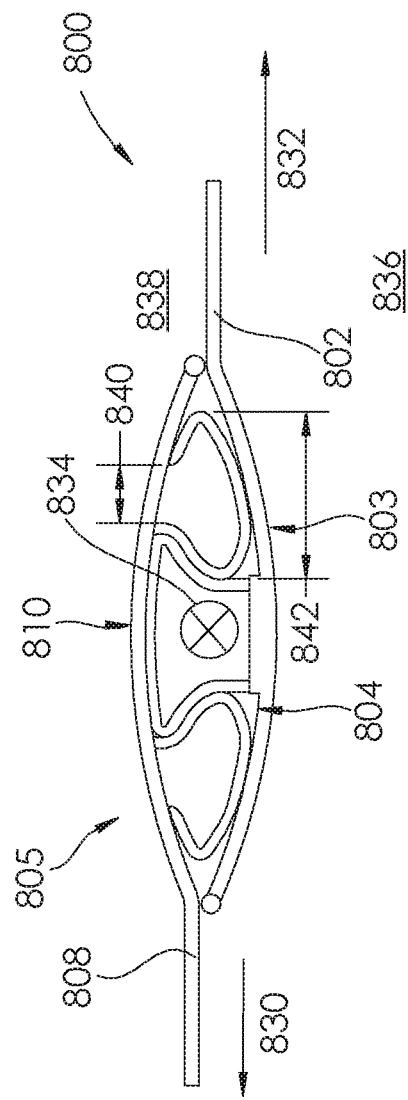

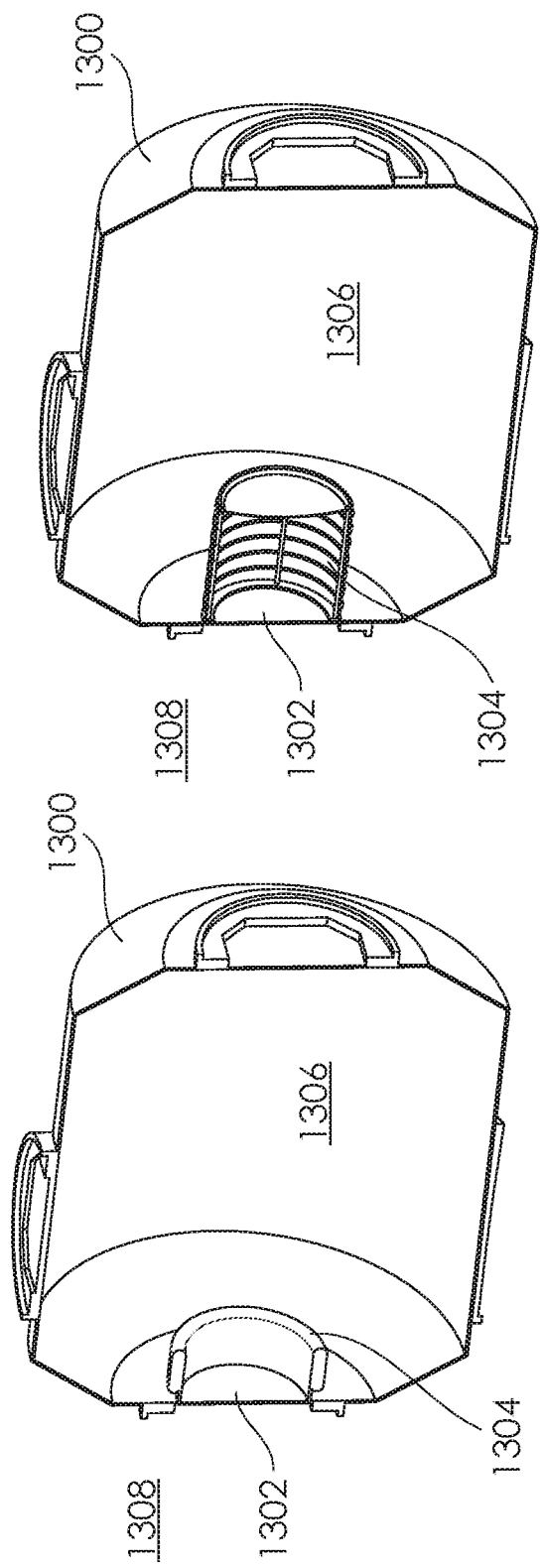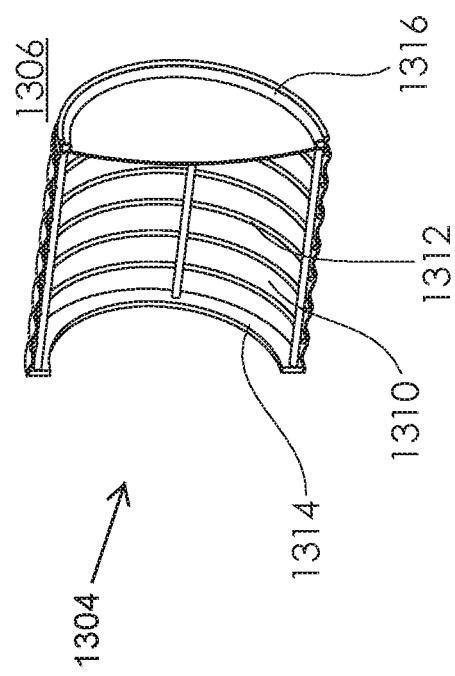

US 10,858,126 B2

DEFORMABLE CLOSURE MECHANISM

CROSS-REFERENCE TO RELATED PATENT APPLICATION(S)

This patent application claims the benefit of and priority to U.S. Provisional Patent Application Number 62/299,761, filed on Feb. 25, 2016, the contents of which are hereby incorporated by reference in their entirety.

STATEMENT REGARDING FEDERALLY SPONSORED RESEARCH OR DEVELOPMENT

The invention described herein was made in the performance of work under a NASA contract and by employees of the United States Government and is subject to the provisions of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore.

BACKGROUND OF THE INVENTION

An airlock may be used in space to provide the ability to transition between a pressurized volume, i.e. within a space vehicle, and free space. An airlock may be used to perform maintenance or repairs to spacecraft, construct or repair structures or devices, or conduct in-space experiments, etc. Commonly, rigid structures may be used to construct airlocks, which may include pressure vessels, hatches and seals. As such these rigid structures may be heavy and difficult to package into a small volume.

BRIEF SUMMARY

In certain examples, a deformable closure mechanism may include an aperture extending between a first of the environment and a second environment, and an aperture seal extending around a perimeter of the aperture. The aperture seal may also include a seal seat spaced between an internal support structure and an external support structure. Additionally, the aperture seal may have a barrier structure configured to resealably seal the aperture. The barrier structure may also have a central membrane constructed from a first deformable material and a barrier seal constructed from a second deformable material, and extending around at least a portion of the perimeter of the central membrane. The barrier seal may be inflated to a first pressurization level, and a gap may be present between the barrier structure and the aperture. However, when the barrier seal is inflated to a second pressurization level, higher than the first pressurization level, at least a portion of an external surface of the barrier seal may be expanded into and abut the seal seat to seal the aperture.

These and other features, advantages, and objects of the present disclosures will be further understood and appreciated by those skilled in the art by reference to the following specification, claims, and appended drawings.

BRIEF DESCRIPTION OF THE SEVERAL VIEWS OF THE DRAWINGS

FIGS. 2A-2B schematically depict cross-sectional views of one implementation of a deformable closure mechanism, according to one or more aspects described herein;

FIGS. 6A-6C schematically depict three implementations of compactable airlock structures, according to one or more aspects described herein;

FIGS. 7A-7B schematically depict an implementation of a deformable closure mechanism come according to one or more aspects described herein;

FIGS. 8A-8D schematically depict removably coupling two deformable wall structures to one another using a deformable closure mechanism, according to one or more aspects described herein;

FIGS. 13A-13C schematically depict cross-sectional isometric views of an airlock structure being deployed from a compressed/stowed configuration to an expanded configuration within a compartment of a space vehicle, according to one or more aspects described herein.

Further, it is to be understood that the drawings may represent the scale of different components of various examples; however, the disclosed examples are not limited to that particular scale. Further, the drawings should not be interpreted as requiring a certain scale unless otherwise stated.

DETAILED DESCRIPTION

Figure 1:
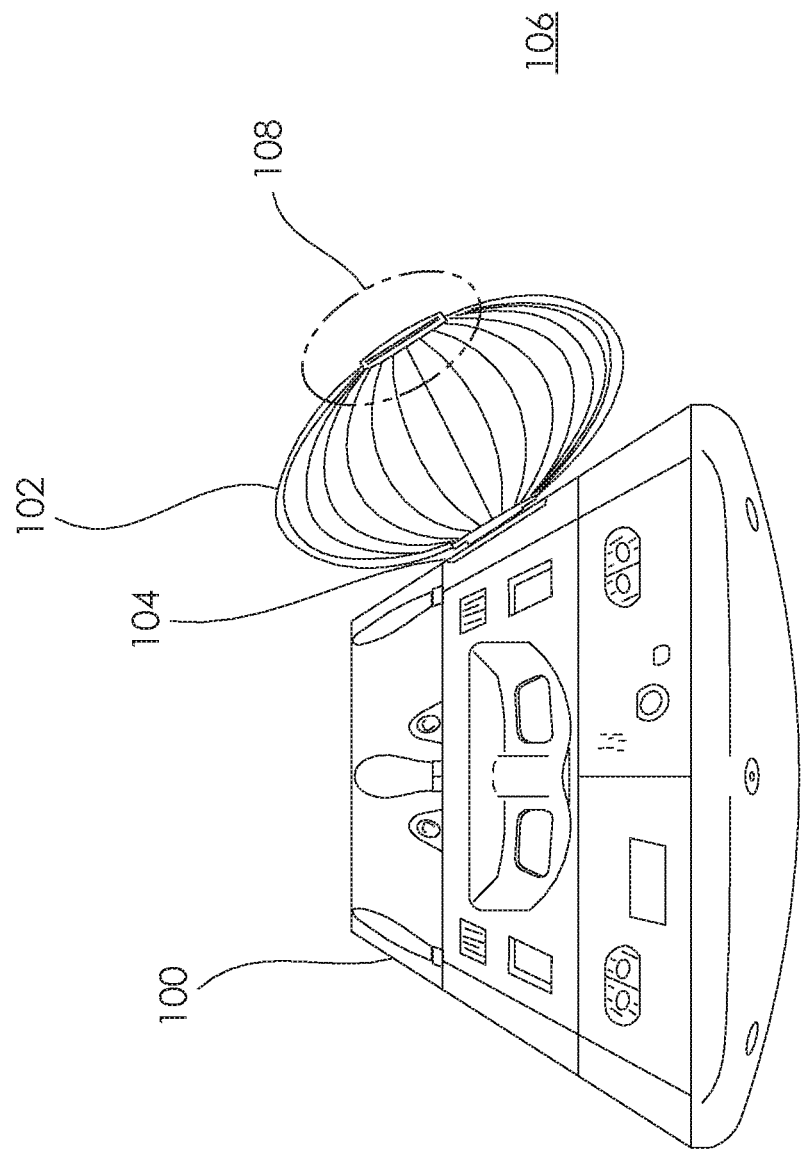
FIG. 1 schematically depicts a space vehicle removably coupled to an example airlock structure, according to one or more aspects described herein.

For purposes of description herein, the terms "upper," "lower," "right," "left," "rear," "front," "vertical," "horizontal," and derivatives thereof may relate to the elements as oriented in FIG. 1. However, it is to be understood that the various implementations described throughout these disclosures may assume various alternative orientations and step sequences, except where expressly specified to the contrary. It is also to be understood that the specific devices and processes illustrated in the attached drawings, and described in the following specification, are simply exemplary embodiments of the concepts defined in the appended claims. Hence, specific dimensions and other physical characteristics relating to the embodiments disclosed herein are not to be considered as limiting, unless the claims expressly state otherwise.

In the following disclosure, reference is made to one or more deformable structures and/or elements. It is contemplated that wherever this terminology is used, it should be understood that the applicable structures and/or elements may be constructed from one or more fabrics, sheets, or panels, among others. It should also be understood that the described deformability may refer to the ability of a given structure and/or element to bend, fold, compress, expand, and/or stretch, among others, without the given structure and/or element experiencing partial or full structural failure in one or more of multiple possible failure modes. Additionally, a deformable structure or element, as described herein, may be constructed from one or more polymers, composite materials (fiber-reinforced materials), metals, alloys, and/or ceramics, and from one or more synthetic or naturally occurring materials. In certain specific examples, one or more of the deformable structures discussed throughout these disclosures may include, among others: aramid fiber. It is further contemplated that a deformable structure and/or element may include one or more semi-rigid or rigid structural elements, without departing from the scope of these disclosures FIG. 1 depicts a space vehicle/spacecraft 100 that is removably coupled to an airlock structure 102, according to one or more aspects described herein. It is contemplated that the space vehicle 100 may include any vessel, or portion thereof, capable of transporting human occupants or other cargo to and/or from, for example, low/high Earth orbit, the Moon, an extraterrestrial planet, a space object (e.g. an asteroid), and/or outer space. As such, different space vehicle implementations to that of the depicted space vehicle 100 may be utilized, without departing from the scope of these disclosures. It is further contemplated that the space vehicle 100 may comprise one or more rigid structures, and a hatch, or other opening structure, such as hatch 104, that may be utilized to transfer personnel and/or other cargo between an internal environment within the space vehicle 100, and an external environment 106. In certain implementations, an airlock structure 102 may be utilized to provide an internal volume within which an environmental pressure may be adjusted to approximately or fully equilibrate with an environmental pressure within the space vehicle 100, or the external environment 106. In one implementation, the airlock structure 102 may comprise a deformable structure that is configured to be stowed in a compacted configuration during transport, and deployed to an expanded configuration, as depicted in FIG. 1, for use. Various implementations of deformable airlock structures are discussed throughout this disclosure. As such, systems and methods described herein should not be limited to the depicted implementation of airlock structure 102.

In one example, the airlock structure 102 includes a deformable closure mechanism 108. This deformable closure mechanism 108 may otherwise be referred to as a deformable hatch 108, and may be utilized to provide a resealable opening through which personnel and/or other cargo may enter or exit the airlock structure 102. Various implementations of the deformable closure mechanism 108 are discussed in relation to the proceeding figures. In the depicted implementation, it is contemplated that the airlock structure 102 and the deformable closure mechanism 108 are configured to provide one or more internal compartments that are fully sealable from the external environment 106 and/or an internal environment within the space vehicle 100. As such, the airlock structure 102 and the deformable closure mechanism 108 may be fully airtight when the deformable closure mechanism 108 is sealed. In one example, the airlock structure 102 and the deformable closure mechanism 108 may be airtight when a pressure differential between a first environment within the airlock structure 102 and a second environment (e.g. the external environment 106 and/or the internal environment within the space vehicle 100) ranges between: 0 and at least 1 atm (standard atmosphere), 0 and 1 atm, 0 and 2 atm, 0 and 3 atm, or 0 and 4 atm.

It is further contemplated that the airlock structure 102 and/or the deformable closure mechanism 108 may prevent ingress/egress of other gases (in addition to those constituent gases of air), liquids, solid materials, as well as offering a level of radiation protection and/or thermal insulation. Additionally, the systems and methods described in relation to the proceeding figures may be implemented for additional or alternative space structures beyond the airlock structure 102. For example, the systems and methods described herein may be utilized within implementations of habitat systems, hangar/repair facilities, rover ingress/egress structures, tunnel systems with hatches, tank farms etc. Further, the proceeding disclosures describe various implementations of deformable closure mechanisms (e.g. deformable closure mechanism 108) and deformable enclosures (e.g. airlock 102) that may be utilized in applications in addition to those related to space travel. For example, the deformable closure mechanism and deformable enclosure implementations described in relation to the proceeding figures may be implemented wherever a partially or fully sealed environmental barrier is to be used. For example, these disclosures may be utilized with various implementations of: tents, bags/other storage containers, barometric chambers, crew quarters, portable tankage systems (e.g. for fire control, water and fuel transport), or isolation systems (e.g. disease control tents, clean rooms), among others.

FIGS. 2A and 2B schematically depict cross-sectional views of one implementation of a deformable closure mechanism 200, according to one or more aspects described herein. In one example, the deformable closure mechanism 200 may be similar to the deformable closure mechanism 108 described in relation to FIG. 1. FIG. 2A schematically depicts a portion of an aperture 202 of a superstructure 204. In one example, the superstructure 204 may be an airlock structure, similar to airlock structure 102. The aperture 202 may extend between a first environment 206 and a second environment 208. In one example, the first environment 206 may be an environment within an internal compartment of the superstructure 204 and the second environment 208 may be an environment external to the superstructure 204 (e.g., an atmosphere within another vehicle, Earth's atmosphere, lunar atmosphere, an extraterrestrial atmosphere, or outer space, among others).

As schematically depicted in FIG. 2A, a barrier structure 210 is spaced apart from the aperture 202, and in particular, an aperture seal 212. As such, in the depicted implementation of FIG. 2A, a gap exists between the barrier structure 210 and the aperture seal 212, such that the first environment 206 is not isolated (sealed) from the second environment

208. FIG. 2B depicts a second configuration with the barrier structure 210 engaged with the aperture seal 212 to seal the aperture 202.

Figure 2C:
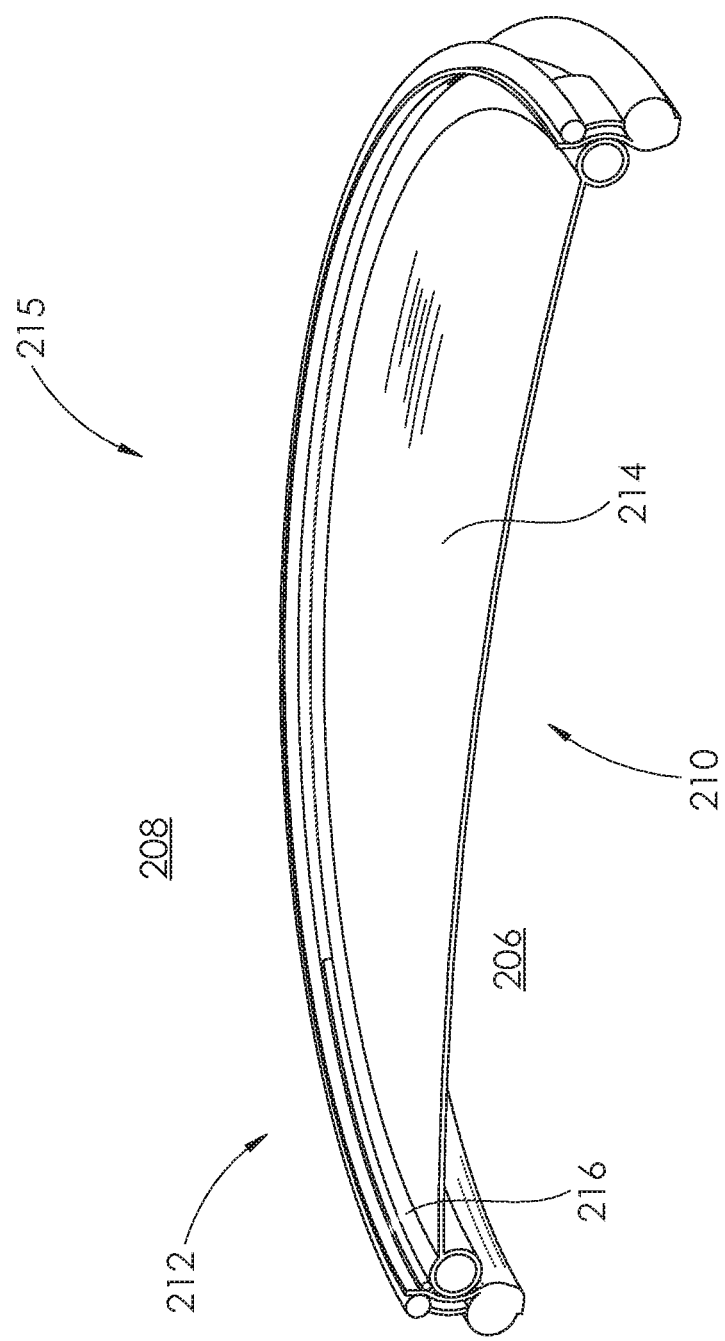
FIG. 2C schematically depicts a cross-sectional isometric view of an example barrier structure resealably sealed to an aperture seal, according to one or more aspects described herein.

FIG. 2C schematically depicts a more detailed cross-sectional isometric view of the barrier structure 210 resealably sealed to the aperture seal 212, according to one or more aspects described herein. It is contemplated that the combination of the barrier structure 210 and the aperture seal 212 may be referred to as a deformable closure mechanism 215. A deformable closure mechanism 215 may be configured to resealably seal an aperture of a superstructure, such as that aperture 202 of airlock 204. In one implementation, FIG. 2C schematically depicts the barrier structure 210 as having a central membrane 214 that is constructed from a deformable material. A barrier seal 216 may be constructed from a same or a different deformable material to the central membrane 214, and may extend around at least a portion of a perimeter of the central membrane 214. In the depicted implementation, the barrier structure 210 is configured to resealably seal a circular aperture, such that the perimeter of the central membrane 214 is substantially circular in shape, and the barrier seal 216 has toroidal geometry. However, it is contemplated that the barrier structure 210 may be utilized to resealably seal apertures having different, non-circular geometries, without departing from the scope of these disclosures. In one specific example, a barrier structure, similar to barrier structure 210 may include one or more spherical barrier seal elements, which have functionality similar to the toroidal barrier seal 216.

Further, it is generally contemplated that the barrier structure 210 and the aperture seal 212 may include additional elements to those depicted in FIG. 2C. As such, it is contemplated that the central membrane 214 may comprise multiple layers of one or more deformable materials configured to provide one or more functions (e.g. abrasion and impact resistance, a radiation barrier, and/or thermal insulation, among others). It is contemplated that the central membrane 214 may have an area that is partially or fully transparent (e.g. a window portion), without departing from the scope of these disclosures.

Figure 2D:
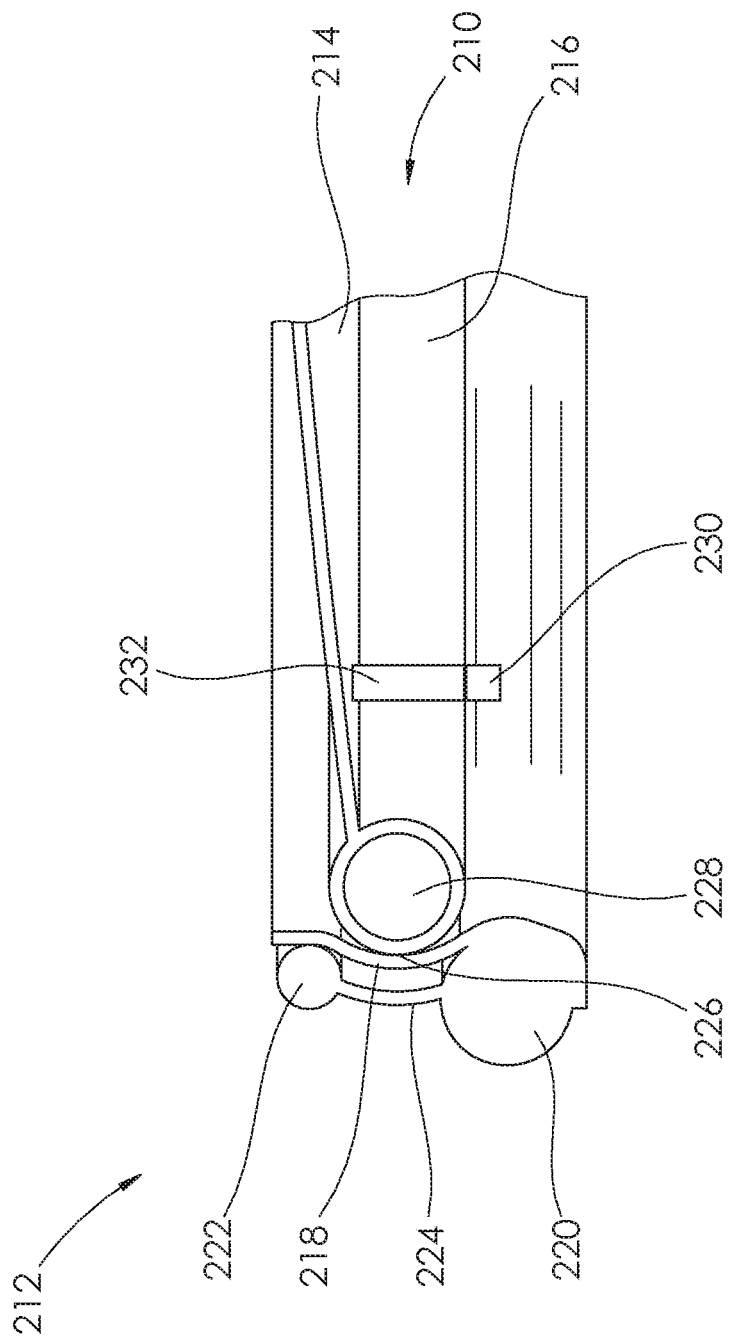
FIG. 2D schematically depicts a cross-sectional isometric view of an example aperture seal engaged with a barrier structure, according to one or more aspects described herein.

FIG. 2D schematically depicts a more detailed cross-sectional isometric view of the aperture seal 212 engaged with the barrier structure 210, according to one or more aspects described herein. In particular, the aperture seal 212 includes a seal seat 218 spaced between an internal support structure 220 and an external support structure 222. In one example, one or more separation flexure elements 224 provide spacing between the internal support structure 220 and the external support structure 222. In one example, the seal seat 218 is constructed from one or more deformable fabric materials. Additionally, the internal support structure 220 and the external support structure 222 may be constructed from one or more deformable or semi-rigid elements (e.g. rods, cables, among others). In one specific example, one or more of the internal support structure 220 and the external support structure 222 may include inflatable structures. In one example, one or more separation flexure elements 224 may be configured to space apart the internal support structure 220 from the external support structure 222. Additionally or alternatively, the flexure elements 224 may be configured to allow the internal support structure 220 and the external support structure 222 to move toward one another upon activation of the barrier seal 216.

In order to seal the aperture, the barrier seal 216 may be inflated from a first pressurization level to a second pressurization level, higher than the first pressurization level. It is contemplated that these pressurization levels may have different values depending on the size of the barrier structure 210, and as such, the systems and methods described herein should not be limited to specific pressurization levels. When inflated to the second pressurization level, at least a portion of an external surface 226 of the barrier seal 216 may be expanded into and abut the seal seat 218. Further, this expansion may compress the barrier seal 216 against the seal seat 218 to resealably seal the barrier structure 210 against the aperture seal 212. It is contemplated that the barrier seal 216 may include one or more internal chambers or bladders 228 into which air or another gas is introduced in order to inflate the seal 216 and resealably seal the aperture 202.

In one implementation, when the barrier seal 216 is inflated to the first pressurization level (i.e. when the barrier seal 216 is partially or fully deflated), a gap exists between the barrier structure 210 and the aperture 202, and/or the barrier structure 210 may move relative to the aperture 202. When the barrier seal 216 is activated, as depicted in FIG. 2D, the barrier seal 216 is inflated to the second pressurization level, and the expanded barrier seal 216 may exert a force on the seal seat 218, which may urge the internal support structure 220 and the external support structure 222 toward one another. This movement of the internal support structure 220 toward the external support structure 222 may further enhance the seal around the aperture 202.

In one example, the seal seat 218 may have a concave geometry, and the barrier seal 216 may have a complementary geometry (i.e. a rounded outer surface area 226 with a radius approximately equal to the concave geometry of the seal seat 218. In another example, a selected one of the barrier seal 216 or the seal seat 218 may be configured to compress and conform to a geometry of the other element upon activation of the barrier seal 216.

In other implementations, it is contemplated that a seal seat, similar to seal seat 218, may comprise different geometries to that concave geometry depicted in FIG. 2D. For example, a seal seat may comprise a deformable, or a partially or fully rigid structure, and may have a U-shaped, or C-shaped channel into which at least a portion of the barrier seal 216 is expanded in order to seal an aperture, such as aperture 202.

In one implementation, the barrier structure 210 may include one or more inflatable, or partially or fully rigid rib structures that extend across at least a portion of the central membrane 214. These rib structures may be configured to provide added rigidity to the barrier structure 210 such that the barrier structure 210 may resist deformation due to a pressure differential between the first environment 206 and the second environment 208.

In one example, the deformable closure mechanism 215 may include alignment structures configured to removably couple the barrier structure 210 to the aperture seal 212 before the barrier seal 216 is activated to seal the barrier structure 210 to the aperture 202. Schematically depicted in FIG. 2D is a first alignment structure 230 coupled to the aperture seal 212 and a second alignment structure 232 coupled to the barrier structure 210. It is contemplated that the first alignment structure 230 may be coupled to one or more portions of the aperture seal 212. E.g. embedded within, rigidly coupled to one or more external surfaces, or hingedly coupled to one or more external surface of the aperture seal 212, among others. Similarly, it is contemplated that the second alignment structure 232 may be coupled to one or more structures of the barrier structure 210, including, among others, the central membrane 214 and/or the barrier seal 216. As such, elements 230 and 232 are merely schematic representations of alignment structures, and additional or alternative positioning implementations may be utilized, without departing from the scope of these disclosures. In one example, the alignment structures 230 and 232 may comprise magnetic elements (e.g. permanent magnets and/or one or more metallic materials that are magnetically attracted to magnets), hook and loop fasteners, a flexible tether element, a flexible tie, a chain, or a rope, among others. It is further contemplated that the deformable closure mechanism 215 may utilize a single pair of alignment structures 230 and 232, or a plurality spaced around at least a portion of a perimeter of the aperture 202.

Figure 3:
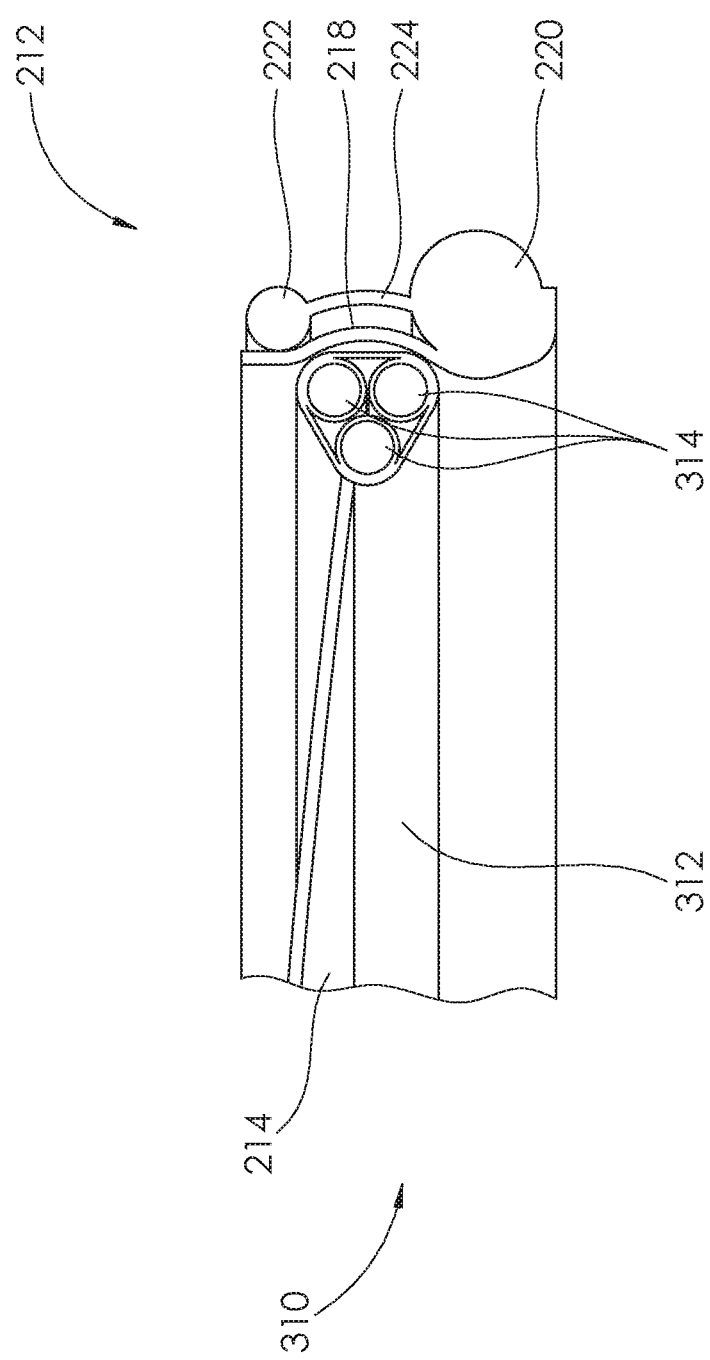
FIG. 3 schematically depicts a cross-sectional isometric view of another example implementation of an aperture seal engaged with a barrier structure, according to one or more aspects described herein.

FIG. 3 schematically depicts a cross-sectional isometric view of another implementation of an aperture seal 212 engaged with a barrier structure 310, according to one or more aspects described herein. In one example, the barrier structure 310 may be similar to barrier structure 210, and include an external sealing surface 312 that encapsulates multiple internal bladders 314. Accordingly, in order to engage a seal around the aperture seal 212, the internal bladders 314 may be inflated, which may urge at least a portion of the external sealing surface 312 to expand into and abut the seal seat 218. It is contemplated that while three internal bladders 314 are depicted in FIG. 3, the systems and methods described herein may be utilized with any number of internal bladders 314, without departing from the scope of these disclosures. In one example, the internal bladders 314 may be configured to impart a design geometry on the external sealing surface 312. This design geometry may be utilized to complement a geometry of the seal seat 218, or to provide a geometry that is adapted to compress in a predictable manner to provide a reliable seal of the barrier structure 310 to the aperture seal 212.

Figure 4:
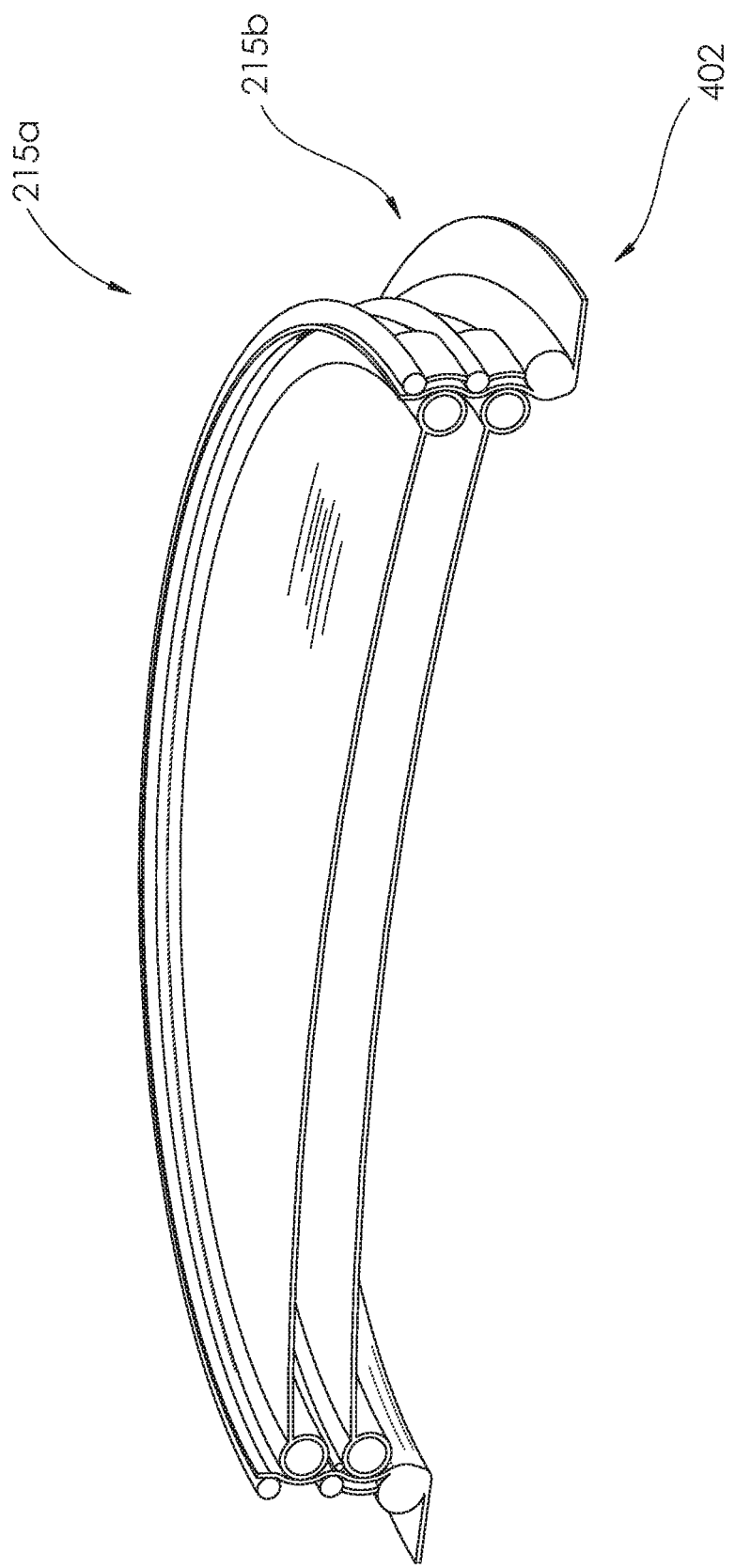
FIG. 4 schematically depicts a cross-sectional isometric view of an example deformable closure mechanism that has integrated redundancy, according to one or more aspects described herein.

FIG. 4 schematically depicts a cross-sectional isometric view of a deformable closure mechanism that has integrated redundancy, according to one or more aspects described herein. In particular, FIG. 4 schematically depicts an aperture 402, which may be similar to aperture 202, which has two deformable closure mechanisms 215a and 215b. The two deformable closure mechanisms 215a and 215b may be configured to be implemented as a single integrated closure mechanism such that a selected closure mechanism, from the closure mechanisms 215a and 215b, provides redundancy in the eventuality that the other closure mechanism suffers a partial or catastrophic failure. As such, it is contemplated that three or more deformable closure mechanisms, similar to deformable closure mechanism 215, may be utilized to provide additional redundancy, without departing from the scope of these disclosures.

Figure 5:
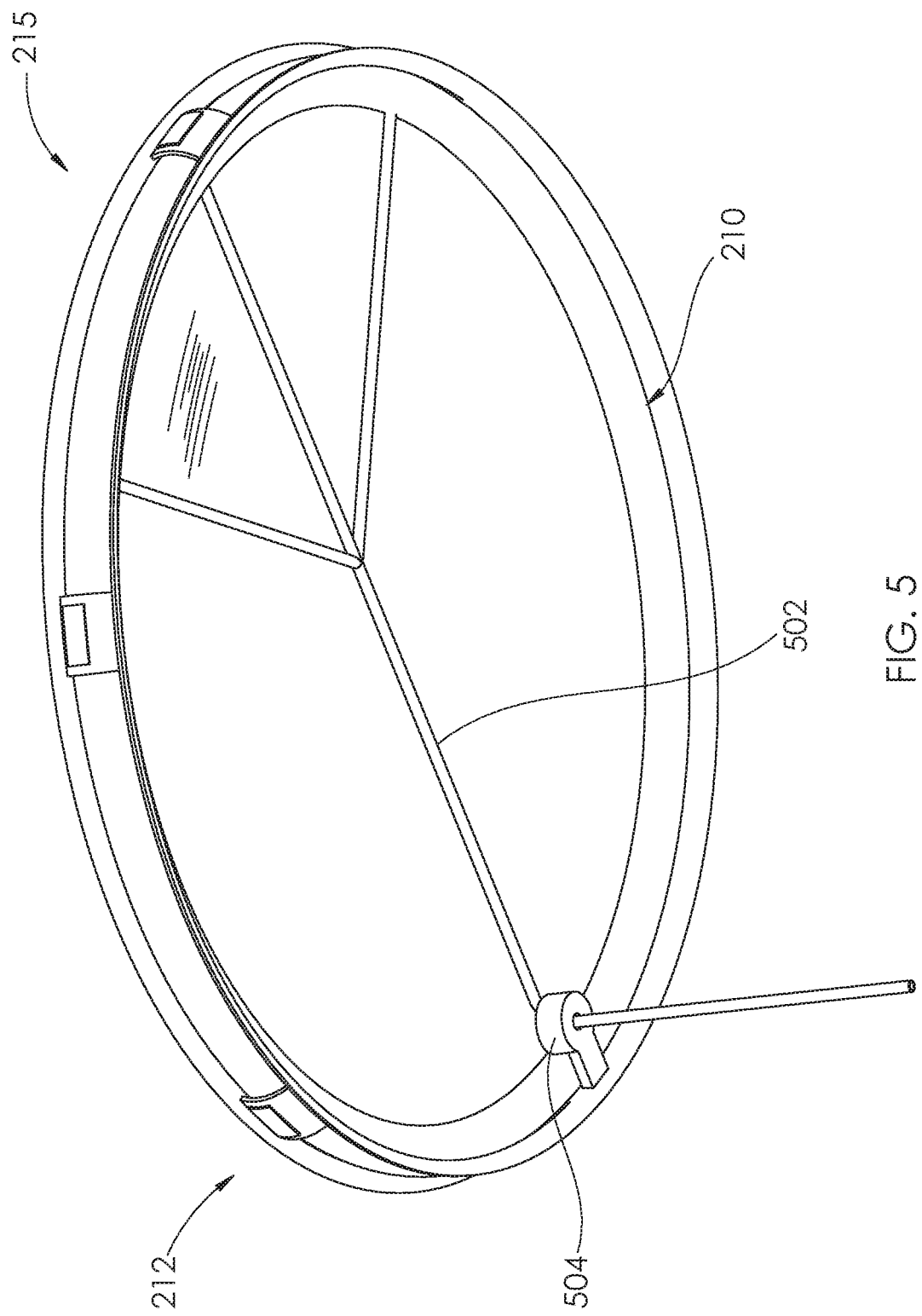
FIG. 5 schematically depicts one implementation of a mechanism for removably coupling a barrier structure to an aperture seal, according to one or more aspects described herein.

It is contemplated that access through the aperture 202, and through the barrier structure 210, may be provided by partially or wholly deflating the barrier seal 216 such that it disengages from the aperture seal 212. Subsequently, the aperture 202 may be partially or fully opened by partially or fully uncoupling the barrier structure 210 from the aperture seal 212. As such, the barrier structure 210 may be pivoted or folded away from the aperture seal 212, among others. FIG. 5 schematically depicts one implementation of a mechanism for removably coupling the barrier structure 210 to the aperture seal 212. In one example, one or more cords or cables 502 may be utilized to manually or mechanically deploy and/or retract the barrier structure 210 when the barrier seal is in a partially inflated or deflated configuration prior to inflation of the barrier seal 216 to a pressurization level that seals the barrier seal 216 against the aperture seal 212. In one example, the cords may be pulled through a guide structure 504 that is coupled to a surface of the aperture seal 212.

FIGS. 6A-6C schematically depict three implementations of compactable airlock structures 602, 604, and 606, respectively. Advantageously, the airlock structures 602, 604, and 606, may be designed to be compacted for more efficient storage until such time that the airlock functionality is needed. At that point, the airlock structures 602, 604, and 606 may be deployed to the expanded configurations depicted in FIGS. 6A-6C. Accordingly, the airlock structures 602, 604, and 606 may be constructed from non-rigid/deformable, semi-rigid, and/or rigid structures and materials. Further, the airlock structures 602, 604, and 606 may be configured with one or more internal compartments configured to accommodate one or more human personnel members. In certain examples, the airlock structures 602, 604, and 606 may be assembled into the deployed configurations depicted in FIGS. 6A-6C by removably coupling multiple subsections together. In one example, these multiple subsections may be removably coupled to one another using deformable seals, otherwise referred to as deformable closure mechanisms. As such, multiple segments of the airlock structures 602, 604, and 606 may include deformable seals configured to join the subsections together. These deformable seals are schematically depicted as being included in segments 608a-608f of airlock structure 602, segments 610a-610c of airlock structure 604, and segments 612a-612d of airlock structure 606. One implementation of a mechanism that may be used to implement these deformable seals is described in relation to FIGS. 7A-7B.

FIGS. 7A-7B schematically depict an implementation of a deformable closure mechanism 700 that may be utilized to, among others, removably couple subsections of a larger superstructure together (e.g. subsections of airlock structures 602, 604, and 606). In particular, the deformable closure mechanism 700 may be configured to removably couple the first deformable wall structure 702 to a second deformable wall structure 704. In certain implementations, the deformable wall structures 702 and 704 may be subsections of one or more of airlock structure 602, 604, and/or 606. FIG. 7B schematically depicts a more detailed cross-sectional view of the deformable closure mechanism 700 from FIG. 7A. In particular, FIG. 7B schematically depicts a cross-sectional view of a deformable closure mechanism configured to removably couple the first deformable wall structure 702 to the second deformable wall structure 704. In one example, the first deformable wall structure 702 includes inflatable gaskets 706 and 708, and the second deformable wall structure 704 includes inflatable gaskets 710 and 712. Accordingly, the first deformable wall structure 702 may be removably coupled to the second deformable wall structure 704 by overlapping at least a portion of the structure 702 and 704, and inflating the gaskets 706, 708, 710, and 712 to form an interlocking seal. It is contemplated that the interlocking seal may include fewer or more than the depicted gaskets 706, 708, 710, and 712, without departing from the scope of these disclosures.

FIGS. 8A-8D schematically depict steps for removably coupling two deformable wall structures to one another using a deformable closure mechanism 800, according to one or more aspects described herein. FIG. 8A schematically depicts a first stage of an activation sequence of the deformable closure mechanism 800, and includes a first deformable wall structure 802 that has a first seal structure 803. The first seal structure 803 further includes a first internal surface 804 and a first inflatable gasket 806 that is coupled to the first internal surface 804. A second deformable wall structure 808 is configured to be removably coupled to the first wall structure 802, and includes a second seal structure 805. In one example, the second seal structure 805 further includes a second internal surface 810, and second and third inflatable gaskets 812 and 814 that are spaced apart from one another and each coupled to the second internal surface 810. Additionally, the first deformable wall structure 802 may include a reinforcing element 816 and the second deformable wall structure 808 may include a reinforcing element 818. It is contemplated that the reinforcing elements 816 and 818 may be configured to provide a partial seal between the seal structures 803 and 805 when the wall structures 802 and 808 are positioned overlapping one another, as depicted in FIG. 8A.

FIG. 8B schematically depicts a second stage of the activation sequence of the deformable closure mechanism 800. In particular, FIG. 8B schematically depicts the first, second, and third inflatable gaskets 806, 812, and 814, respectively, in a partially inflated configuration. In one example, in this intermediate stage of the activation sequence of the deformable closure mechanism 800, the first seal structure 803 and the second seal structure 805 are configured to expand and be urged away from one another. As depicted in FIG. 8B, a cavity 820 is formed between the second inflatable gasket 812 and third inflatable gasket 814 into which the first inflatable gasket 806 is configured to expand.

FIG. 8C schematically depicts a third stage of the activation sequence of the deformable closure mechanism 800. In particular, FIG. 8C schematically depicts the first, second, and third inflatable gaskets 806, 812, and 814, respectively, in a fully inflated configuration. When fully inflated, the second and third gaskets 812 and 814 may abut and be compressed against the first internal surface 804, and the first inflatable gasket 806 may abut and be compressed against the second internal surface 810. As depicted, when in a fully inflated configuration, the first, second, and third inflatable gaskets 806, 812, and 814, respectively, may have interlocking geometries configured to seal the first wall structure 802 to the second wall structure 808.

FIG. 8D schematically depicts fourth stage of the activation sequence of the deformable closure mechanism 800. In particular, FIG. 8D schematically depicts the deformable closure mechanism 800 following application of a tensile stress to the first and second seal structures 803 and 805. In one example, the tensile stress applied to the first and second seal structures 803 and 805 may urge the first internal surface 804 toward the second internal surface 810. In one implementation, the tensile stress may be applied to the first wall structure 802 on the second wall structure 808 along those directions indicated by arrows 830 and 832. In one implementation, the applied tensile stress may be perpendicular to a longitudinal axis of the deformable closure mechanism 800. This longitudinal axis may be perpendicular to the plane of FIG. 8D, (e.g. along line the direction of arrow 834).

In one example, the tensile stress applied to the first seal structure 803 and the second seal structure 805 may be configured to fully interlock the first inflatable gasket 806 with the second and third inflatable gaskets 812 and 814. Further, the tensile stress may be applied to the seal structures 803 and 805 as a result of a pressure differential between a first environment 836 and a second environment 838. This pressure differential may, in one example, result from a pressure differential across one or more substructures of an airlock structure, similar to one or more of airlock structure 602, 604, and/or 606.

In one implementation, when in an expanded configuration (e.g. that configuration depicted in FIG. 8C and/or FIG. 8D), a selected one or more of the first inflatable gasket 806, second inflatable gasket 812, and/or third inflatable gasket 814 may have a first width (e.g. width 840) at a proximal end of the selected gasket that is proximate to the internal surface 804 or 810, and a second width (e.g. width 842), greater than the first width, at a distal end of the selected gasket.

It is contemplated that in addition to the interlocking gaskets 806, 812, and 814, the first wall structure 802 and the second wall structure 808 may be removably coupled to one another by one or more additional coupling elements. These additional coupling elements may include one or more fasteners (e.g. hook and loop fasteners, clips, ties, snap button fasteners, or magnetic fasteners, among others).

Figure 9:
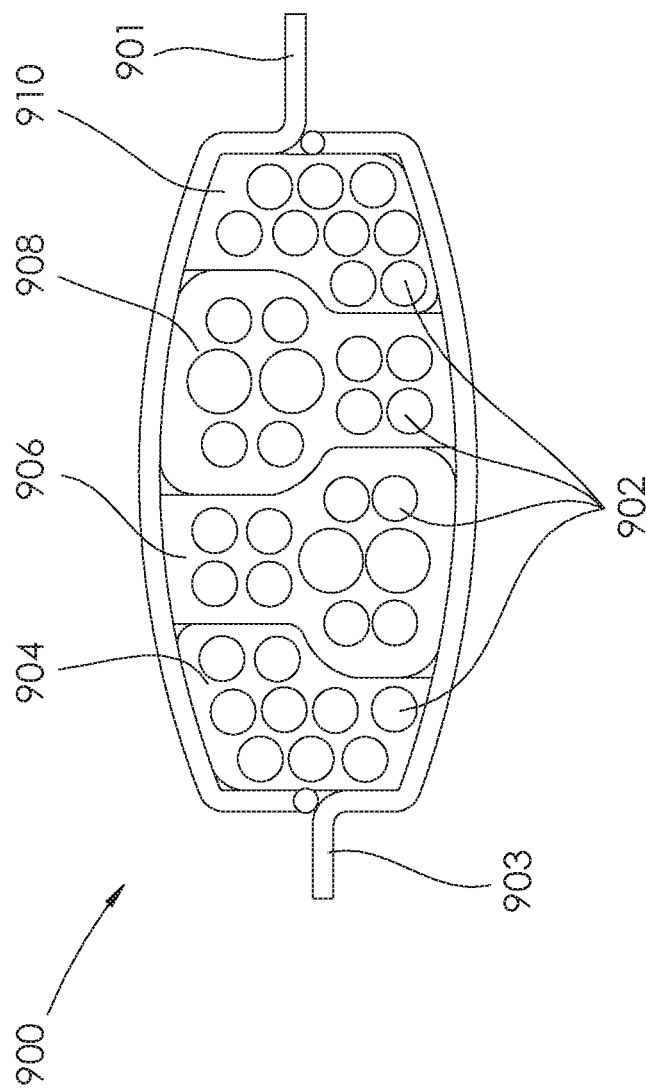
FIG. 9 schematically depicts a cross-sectional view of another implementation of a deformable closure mechanism, according to one or more aspects described herein.

In one example, an interlocking geometry of the inflatable gaskets, such as gaskets 806, 812, and 814, may be maintained by one or more internal elements. As such, FIG. 9 schematically depicts a cross-sectional view of another implementation of a deformable closure mechanism 900, according to one or more aspects described herein. Similar to FIG. 7B, the deformable closure mechanism 900 includes a first deformable wall structure 901 that is removably coupled to a second deformable wall structure 903. The removable coupling is activated by interlocking inflatable gaskets. In the depicted example of FIG. 9, the first deformable wall structure 901 includes inflatable gaskets 906 and 910, and the second deformable wall structure 903 includes inflatable gaskets 904 and 908, which interlock with gaskets 906 and 910. However, it is contemplated that the deformable closure mechanism 900 may be implemented with fewer than or more than the four inflatable gaskets 904, 906, 908, 910, without departing from the scope of these disclosures.

In one implementation, the deformable closure mechanism 900 includes a plurality of internal bladders 902 that are encapsulated by external sealing surfaces of the interlocking inflatable gaskets 904, 906, 908, and 910. These internal bladders 902, otherwise referred to as structural tubes, channels, or spheres, may be utilized to maintain a design geometry of the inflatable gaskets 904, 906, 908, 910. Accordingly, the plurality of internal bladders 902 may be held in one or more specific configurations relative to one another by any fixation methodology, including one or more of welding (e.g. ultrasonic welding, laser welding), gluing, sewing, using one or more mechanical fasteners (e.g. rivets, staples, etc.), among others.

Figure 10:
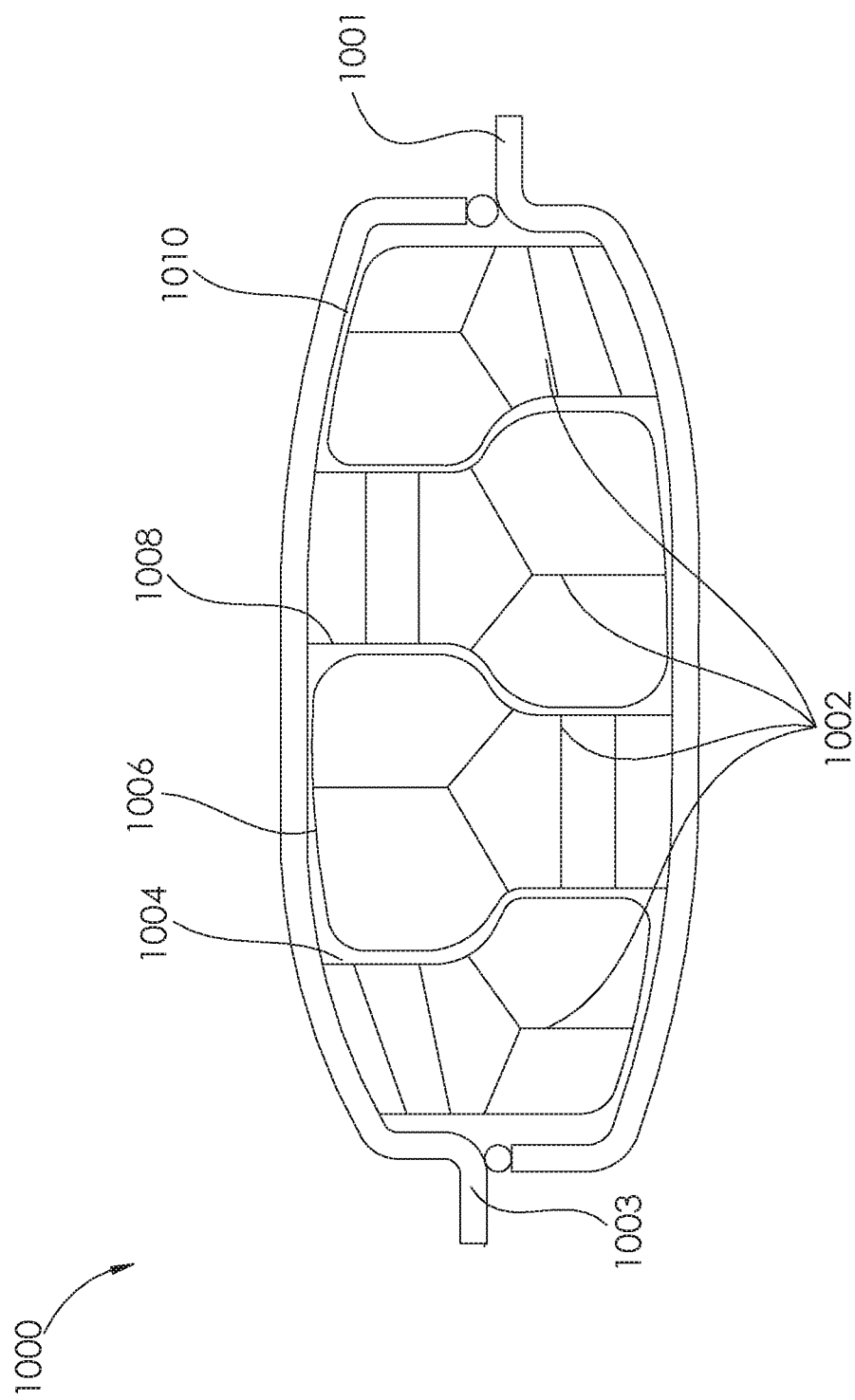
FIG. 10 schematically depicts a cross-sectional view of another implementation of a deformable closure mechanism, according to one or more aspects described herein.

FIG. 10 schematically depicts a cross-sectional view of another implementation of a deformable closure mechanism 1000, according to one or more aspects described herein. In particular, FIG. 10 schematically depicts a cross-sectional view of a first formable wall structure 1001 that is removably coupled to a second deformable wall structure 1003 by interlocking inflatable gaskets 1004, 1006, 1008, and 1010. In one example, a design geometry of the interlocking inflatable gaskets 1004, 1006, 1008, and 1010 may be imparted and/or maintained using one or more internal fibers 1002 that facilitates expansion of the gaskets 1004, 1006, 1008, and 1010 predetermined extents along one or more predetermined directions.

Figure 11A:
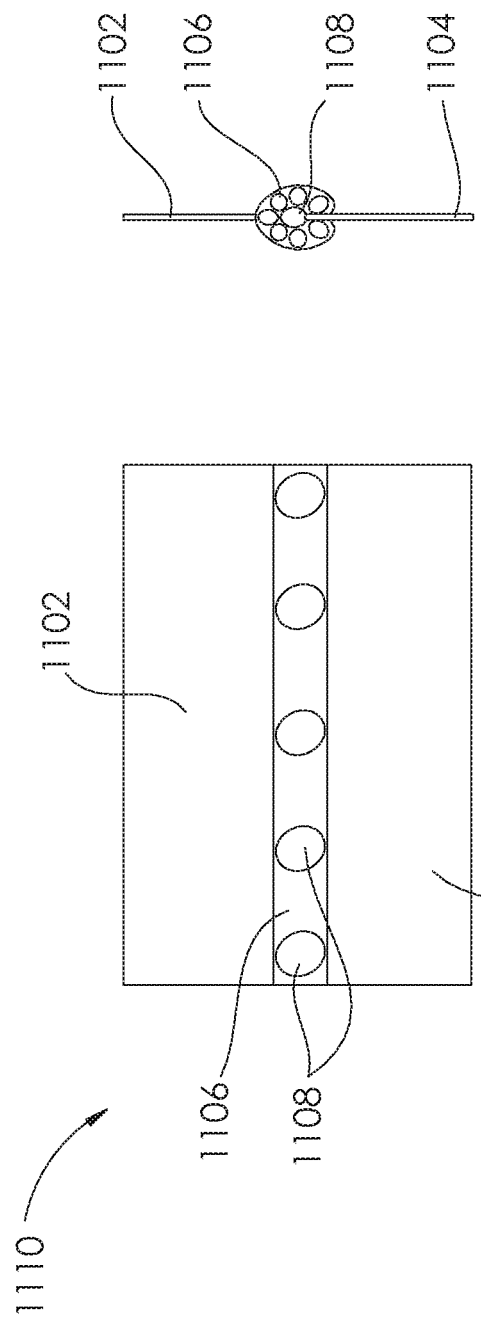
FIGS. 11A-11D schematically depict another implementation of a deformable closure mechanism, according to one or more aspects described herein.
Figure 11B:
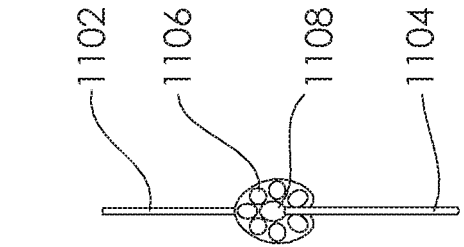

FIGS. 11A-11D schematically depict another implementation of a deformable closure mechanism 1100, according to one or more aspects described herein. In particular, FIG. 11A schematically depicts a front elevation view of a first deformable wall 1102 that is removably coupled to a second deformable wall 1104. As depicted, the second deformable wall 1104 is in a deployed configuration relative to the first deformable wall 1102. FIG. 11B schematically depicts an end elevation view of this deployed configuration. The first deformable wall 1102 may include a first seal structure that has an inflatable channel 1106. This inflatable channel 1106 may be configured to receive a second seal structure of the second deformable wall 1104. This second seal structure may include a bearing channel that includes a plurality of bearing elements 1108. In one implementation, the plurality of bearing elements 1180 may be rigidly coupled to the second deformable wall 1104, and configured to be retained within the inflatable channel 1106, when fully inflated. It is contemplated that the bearing elements 1108 may include one or more rods, ball bearings, or other slider elements. Further, it is contemplated that the bearing elements 1108 may be configured to slide within the inflatable channel 1106 to facilitate sliding of the first deformable wall 1102 relative to the second deformable wall 1104.

Figure 11C:
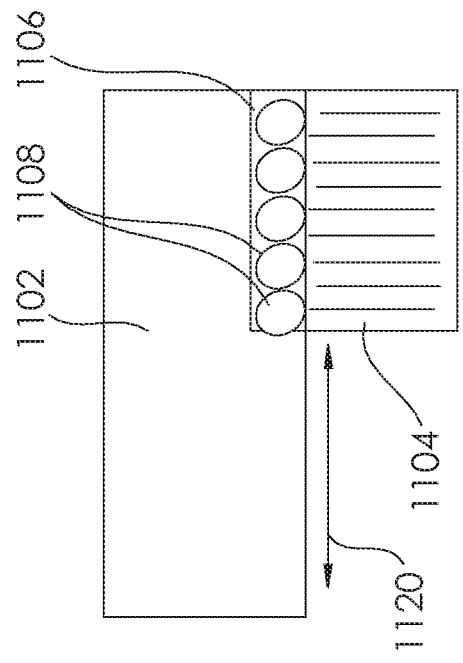
Figure 11D:
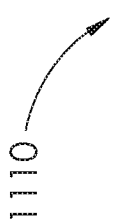

FIG. 11C schematically depicts a front elevation view of the first deformable wall 1102 removably coupled to the second deformable wall 1104. As depicted in FIG. 11C, the second deformable wall 1104 is in a retracted configuration relative to the first deformable wall 1102. FIG. 11D schematically depicts an end elevation view of this retracted configuration. As schematically depicted in FIG. 11C, the slidable coupling of the bearing elements 1108 within the inflatable channel 1106 allows the second deformable wall 1104 to slide along that direction indicated by arrow 1120. As such, the slidable coupling facilitated by the deformable closure mechanism 1100 may be utilized to construct seal mechanisms with sliding functionality that may be utilized to construct one or more resealable closures.

Figure 12A:
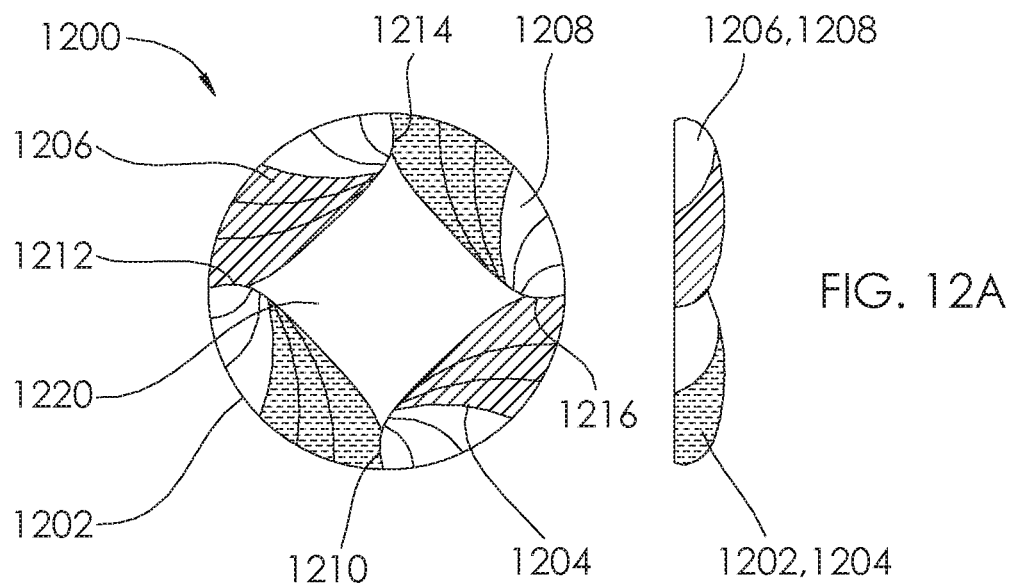
FIGS. 12A-12C schematically depict one implementation of a resealable closure, according to one or more aspects described herein.
Figure 12B:
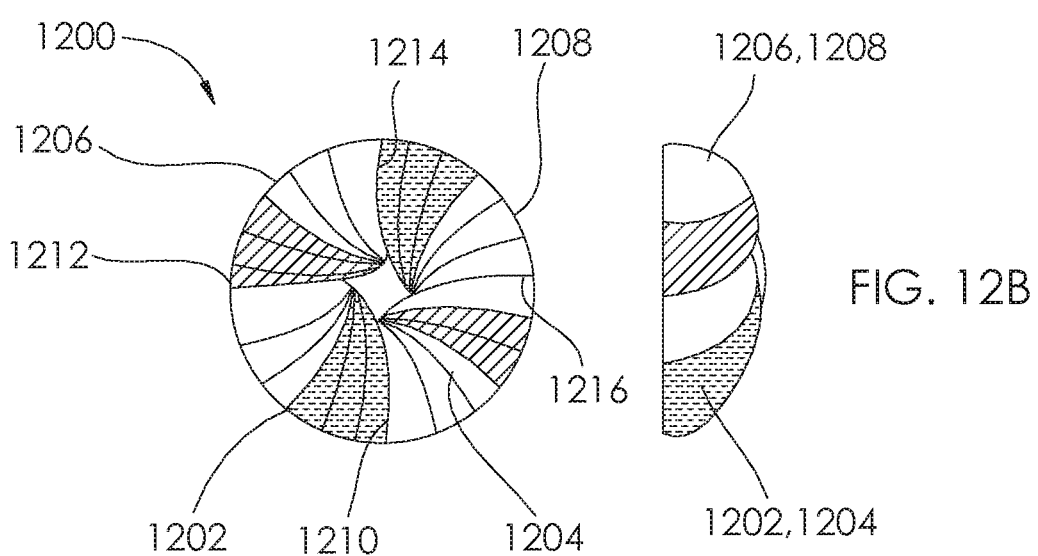
Figure 12C:
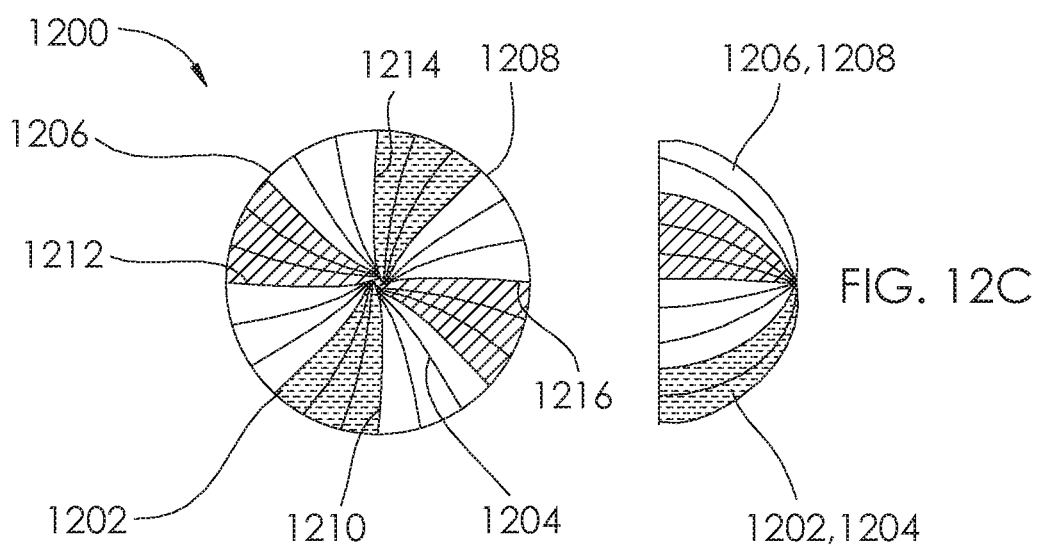

FIGS. 12A-12C schematically depict one implementation of a resealable closure, according to one or more aspects described herein. In particular, FIG. 12A schematically depicts a front and an end elevation view of a resealable closure 1200 in a fully open configuration. In one implementation, the resealable closure 1200 may include four deformable wall structures 1202, 1204, 1206, and 1208. The four deformable wall structures 1202, 1204, 1206, and 1208 may be slidably coupled to one another by deformable closure mechanisms along seams 1210, 1212, 1214, and 1216. In one example, the slidable coupling may be facilitated by a deformable closure mechanism similar to the deformable closure mechanism 1100. As depicted, the deformable wall structures 1202, 1204, 1206, and 1208 may be utilized to resealably seal an opening 1220, otherwise referred to as aperture 1220.

FIG. 12B schematically depicts front and end elevation views of the resealable closure 1200 in a partially closed configuration such that the deformable wall structures 1202, 1204, 1206, and 1208 are partially deployed along the deformable closure mechanisms 1210, 1212, 1214, and 1216.

FIG. 12C schematically depicts front and end elevation views of the resealable closure 1200 in a fully closed configuration. As depicted, the deformable wall structures 1202, 1204, 1206, and 1208 are fully deployed along the deformable closure mechanisms 1210, 1212, 1214, 1216. Further, the opening 1220 is fully sealed by the wall structures 1202, 1204, 1206, and 1208.

FIGS. 13A-13C schematically depict cross-sectional isometric views of an airlock structure being deployed from a compressed/stowed configuration to an expanded configuration within a compartment of a space vehicle, according to one or more aspects described herein. In particular, FIG. 13A schematically depicts a cross-sectional isometric view of an airlock structure 1304 in a compressed configuration within a space vehicle 1300. In one example, the vehicle 1300 includes an opening, or hatch 1302 to facilitate transfer of personnel and/or cargo between an internal environment 1306 and an external environment 1308. FIG. 13B schematically depicts a cross-sectional isometric view of the airlock structure 1304 in an expanded, or deployed configuration within the space vehicle 1300. Advantageously, deploying the airlock structure 1304 within the internal environment 1306 of the space vehicle 1300 may reduce the likelihood of the airlock structure 1304 being damaged by debris, radiation, and/or thermal cycling. However, it is contemplated that the systems and methods described throughout these disclosures may be utilized with expandable and/or inflatable airlock structures configured to be positioned external to a space vehicle, such as space vehicle 1300.

FIG. 13C depicts a more detailed cross-sectional isometric view of the airlock structure 1304 in the expanded configuration depicted in FIG. 13B. The airlock structure 1304 may be implemented as a substantially cylindrical structure. However, it is contemplated that additional or alternative airlock geometries may be utilized, without departing from the scope of these disclosures. One or more flexible and deformable materials may be utilized to construct the sidewalls 1310 of the airlock structure 1304, or subsections thereof. Additionally, one or more inflatable, semi-rigid, or rigid ribbing elements 1312 may be utilized to provide structural rigidity to maintain the airlock structure 1304 in the depicted deployed configuration when an atmospheric pressure in the internal environment 1306 of the space vehicle 1300 is greater than a pressure within an internal compartment of the airlock structure. As depicted, the airlock structure 1304 may include deformable closure mechanisms at a first end 1314 and a second end 1316. In one implementation, these deformable closure mechanisms may be similar to the deformable closure mechanism 215 described in relation to FIGS. 2A-2D.

Figure 14B:
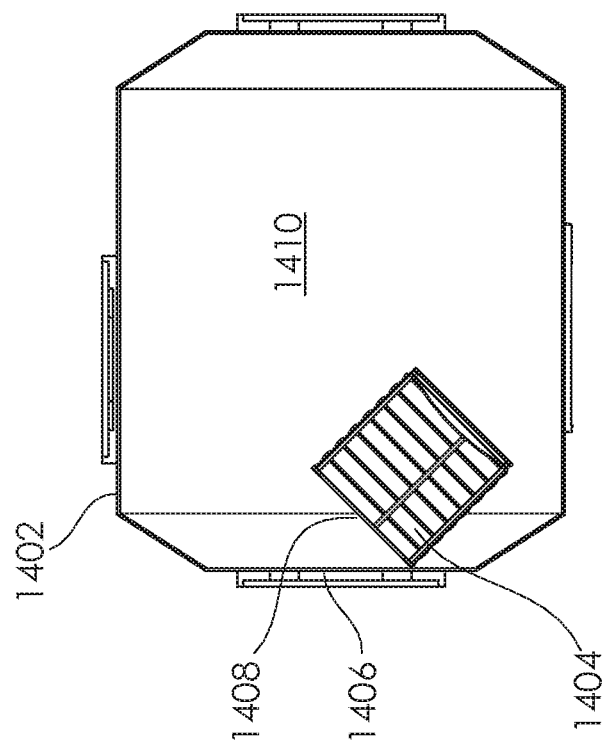
FIGS. 14A and 14B schematically depict a space vehicle having an example airlock structure in a deployed configuration and coupled to a hatch of the space vehicle, according to one or more aspects described herein.
Figure 14A:
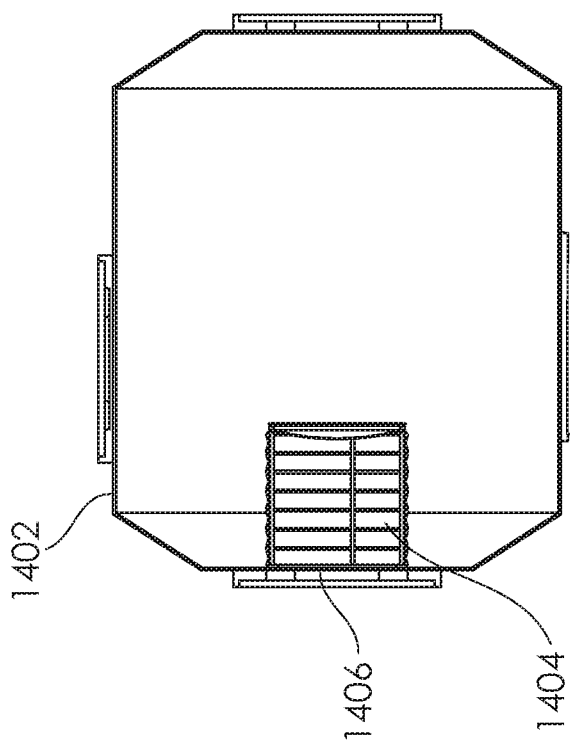

In another implementation, an airlock structure may include a single aperture that is utilized to enter and leave a space vehicle, among others. As such, FIGS. 14A and 14B schematically depict a space vehicle 1402 having an airlock structure 1404 in a deployed configuration and coupled to a hatch 1406 of the space vehicle 1402. As depicted in FIG. 14A, the hatch 1406 may be utilized to enter into or exit from the airlock structure 1404. FIG. 14B depicts the airlock structure 1404 in a second configuration, partially or fully uncoupled from the hatch 1406. As depicted in FIG. 14B, the single opening 1408 in the airlock structure 1404 may be utilized to transfer personnel and/or additional cargo between an internal compartment of the airlock structure 1404, and an internal environment 1410 of the space vehicle 1402.

In one implementation, a deformable closure mechanism may include an aperture extending between a first of the environment and a second environment, and an aperture seal extending around a perimeter of the aperture. The aperture seal may also include a seal seat spaced between an internal support structure and an external support structure. Additionally, the aperture seal may have a barrier structure configured to resealably seal the aperture. The barrier structure may also have a central membrane constructed from a first deformable material and a barrier seal constructed from a second deformable material, and extending around at least a portion of the perimeter of the central membrane. The barrier seal may be inflated to a first pressurization level and a gap may be present between the barrier structure and the aperture. However, when the barrier seal is inflated to a second pressurization level, higher than the first pressurization level, at least a portion of an external surface of the barrier seal may be expanded into and abut the seal seat to seal the aperture.

In one example, a barrier seal includes an internal bladder and an external sealing surface that encapsulates the barrier seal. Further, when the internal bladder is inflated to a second pressurization level, at least a portion of the external sealing surface contacts and conforms to a shape of at least a portion of the seal seat.

In another example, when the internal bladder is inflated to the second pressurization level, the internal bladder has a geometry/a shape that is complementary/similar to that of the seal seat.

In one implementation, when the barrier seal is inflated to the second pressurization level, at least a portion of the external surface of the barrier seal compresses against the seal seat and the internal and external support structures are urged toward one another.

In another implementation, the aperture may be round in shape and the barrier seal may have at least a partial toroidal shape.

In another example, the seal seat may have a deformable structure.

In yet another example, the internal support structure and the external support structure may include inflatable structures.

The seal seat may include a deformable fabric, and the internal and external support structures may be spaced apart from one another by one or more separation flexure elements.

The barrier structure may also include an inflatable rib structure extending across at least a portion of the central membrane.

The barrier seal, when inflated to the second pressurization level, may seal the aperture. The barrier seal may be capable of maintaining an airtight seal when a pressure difference between a first environment and a second environment across the seal ranges between about 0 and at least 1 atm.

In one implementation, a first alignment structure may be coupled to the aperture seal and a second alignment structure may be coupled to the barrier structure. The first alignment structure may be configured to couple to the second alignment structure to align the barrier structure with the aperture seal when the barrier seal is inflated to the first pressurization level, or partially or fully deflated.

The first alignment structure and the second alignment structure may include magnetic elements configured to be magnetically attracted to one another.

The first alignment structure and the second alignment structure may include hook and loop fastener elements that are configured to removably couple to one another.

In one example, the first environment may be within an internal compartment of an airlock of a space vehicle, and the second environment may be Earth's atmosphere, lunar atmosphere, an extraterrestrial atmosphere, or outer space.

In another example, the deformable closure mechanism may include a pull cord that is manually actuated to extend the central membrane over the aperture and bring the barrier seal into contact with the seal seat.

In another implementation, a deformable closure mechanism may include a first deformable wall having a first seal structure. The first seal structure may also include a first internal surface, and a first inflatable gasket that is coupled to the first internal surface. The deformable closure mechanism may also include a second deformable wall that has a second seal structure. The second seal structure may also include a second internal surface, and second and third inflatable gaskets spaced apart from one another and coupled to the second internal surface. The first deformable wall may be removably coupled to the second deformable wall by overlapping the first internal surface with the second internal surface such that the first internal surfaces facing the second internal surface, and by inflating the first second and third gaskets. As such, when inflated, the second and third inflatable gaskets may form a cavity into which the first inflatable gasket may expand and interlock to resealably seal the first deformable wall to the second deformable wall.

The first deformable wall may be resealably sealed to the second deformable wall upon expansion and interlocking of the first inflatable gasket with the second and third inflatable gaskets, and the application of a tensile stress to the first and second seal structures that urges the first internal surface toward the second internal surface.

In one example, the tensile stress is applied perpendicular to a longitudinal axis of the deformable closure mechanism.

In another example, the cavity is a cavity channel extending along a portion of the second deformable wall.

In yet another example, a selected gasket, from the first, second, and third inflatable gaskets, includes an internal inflatable bladder and an external sealing surface that encapsulates the internal inflatable bladder.

The internal bladder may further include internal fibers that maintain a design geometry of the internal bladder when inflated.

The design geometry of the internal bladder may impart an interlockable cross-sectional geometry on the selected gasket.

In one example, when expanded to resealably seal the first deformable wall to the second deformable wall, the first inflatable gasket may have a proximal end with a first width coupled to the first deformable wall and a distal end with a second width, greater than the first width. When expanded, the second and third inflatable gaskets may have proximal ends with third widths coupled to the second deformable wall and distal ends with fourth widths, greater than the third widths.

In another example, when expanded to resealably seal the first deformable wall to the second deformable wall, the distal end of the first inflatable gasket may abut and compress against the second internal surface, and the distal ends of the second and third inflatable gaskets may abut and compress against the first internal surface.

In yet another example, when expanded to resealably seal the first deformable wall to the second deformable wall, the distal end of the first inflatable gasket may abut and compress against the second internal surface.

The first deformable wall and the second deformable wall may be portions of an airlock structure.

The tensile stress may result from an internal pressure on an inside surface of the first and second deformable walls being greater than an external pressure on an outside surface of the first and second deformable walls.

In another implementation, a deformable closure mechanism may include a first deformable wall that has a first seal structure with an inflatable channel. The deformable closure mechanism may also include a second deformable wall that has a second seal structure with a bearing channel. As such, the bearing channel may be configured to be received into the inflatable channel to removably couple the first deformable wall to the second deformable wall.

In one example, when removably coupled to one another, the first deformable wall in the second deformable wall are prevented from moving relative to one another along first and second mutually-perpendicular directions.

In another example, when removably coupled to one another, the first deformable wall in the second deformable wall are slidable along a third direction, mutually-perpendicular to the first and second directions.

In one implementation, the first deformable wall and the second deformable wall may be portions of an airlock structure.

Further, the first deformable wall and the second deformable wall may be portions of an aperture of the airlock.

The present disclosure is disclosed above and in the accompanying drawings with reference to a variety of examples. The purpose served by the disclosure, however, is to provide examples of the various features and concepts related to the disclosure, not to limit the scope of the disclosure. One skilled in the relevant art will recognize that numerous variations and modifications may be made to the examples described above without departing from the scope of the present disclosure.

What is claimed is:

1. A deformable closure mechanism, comprising:
   a first deformable wall having a first seal structure, the first seal structure further comprising:
      a first internal surface;
      a first inflatable gasket coupled to the first internal surface;
   a second deformable, wall having a second seal structure, the second seal structure further comprising:
      a second internal surface; and
      second and third inflatable gaskets, configured to be spaced apart from one another and coupled to the second internal surface,
   wherein the first deformable wall is configured to be removably coupled to the second deformable wall by overlapping the first internal surface with the second internal surface such that the first internal surface is facing the second internal surface, and inflating the first, second and third inflatable gaskets,
   wherein upon inflating, the second and third inflatable gaskets are configured to form a cavity into which the first inflatable gasket expands and interlocks to resealably seal the first deformable wall to the second deformable wall.

2. The deformable closure mechanism of claim 1, wherein the first deformable wall is configured to be resealably sealed to the second deformable wall upon expansion and interlocking of the first inflatable gasket with the second and third inflatable gaskets, and an application of a tensile stress to the first and second seal structures that urges the first internal surface toward the second internal surface.

3. The deformable closure mechanism of claim 2, wherein the tensile stress is applied perpendicular to a longitudinal axis of the deformable closure mechanism.

4. The deformable closure mechanism of claim 1, wherein the cavity is a cavity channel extending along a portion of the second deformable wall.

5. The deformable closure mechanism of claim 1, wherein a selected gasket, from the first, second and third inflatable gaskets, further comprises:
   an internal bladder that is inflatable; and
   an external sealing surface that encapsulates the internal bladder.

6. The deformable closure mechanism of claim 5, wherein the internal bladder further comprises:
   internal fibers that maintain a design geometry of the internal bladder when inflated.

7. The deformable closure mechanism of claim 6, wherein the design geometry of the internal bladder imparts an interlockable cross-sectional geometry on the selected gasket.

8. The deformable closure mechanism of claim 1, wherein upon being expanded to resealably seal the first deformable wall to the second deformable wall, the first inflatable gasket is configured to have a proximal end with a first width coupled to the first deformable wall and a distal end with a second width, greater than the first width, and
   wherein upon being expanded, the second and third inflatable gaskets are configured to have proximal ends with third widths coupled to the second deformable wall and distal ends with fourth widths, greater than the third widths.

9. The deformable closure mechanism of claim 8, wherein when expanded to resealably seal the first deformable wall to the second deformable wall, the distal end of the first inflatable gasket is configured to abut and compresses against the second internal surface, and the distal ends of the second and third inflatable gaskets are configured to abut and compress against the first internal surface.

10. The deformable closure mechanism of claim 9, wherein when expanded to resealably seal the first deformable wall to the second deformable wall, the distal end of the first inflatable gasket abuts and compresses against the second internal surface.

11. The deformable closure mechanism of claim 1, wherein the first deformable wall and second deformable wall are portions of an airlock structure.

12. The deformable closure mechanism of claim 2, wherein the tensile stress results from an internal pressure on an inside surface of the first and second deformable walls being greater than an external pressure on an outside surface of the first and second deformable walls.

13. A deformable closure mechanism, comprising:
   a first deformable wall having a first seal structure, the first seal structure further comprising an inflatable channel; and
   a second deformable wall having a second seal structure, the second seal structure further comprising a bearing channel,
   wherein the bearing channel is configured to be received into the inflatable channel to removably couple the first deformable wall to the second deformable wall.

14. The deformable closure mechanism of claim 13, wherein when removably coupled to one another, the first deformable wall and the second deformable wall are prevented from moving relative to one another along first and second mutually-perpendicular directions.

15. The deformable closure mechanism of claim 14, wherein when removably coupled to one another, the first deformable wall and the second deformable wall are slidable along a third direction, mutually-perpendicular to the first and second directions.

16. The deformable closure mechanism of claim 13, wherein the first deformable wall and second deformable wall are portions of an airlock structure.

17. The deformable closure mechanism of claim 16, wherein the first deformable wall and second deformable wall are portions of an aperture of the airlock.

* * * * *